No. 658,136. Patented Sept. 18, 1900.
H. A. BENEFIEL.
TUBE CUTTER.
(Application filed Mar. 15, 1900.)
(No Model.)
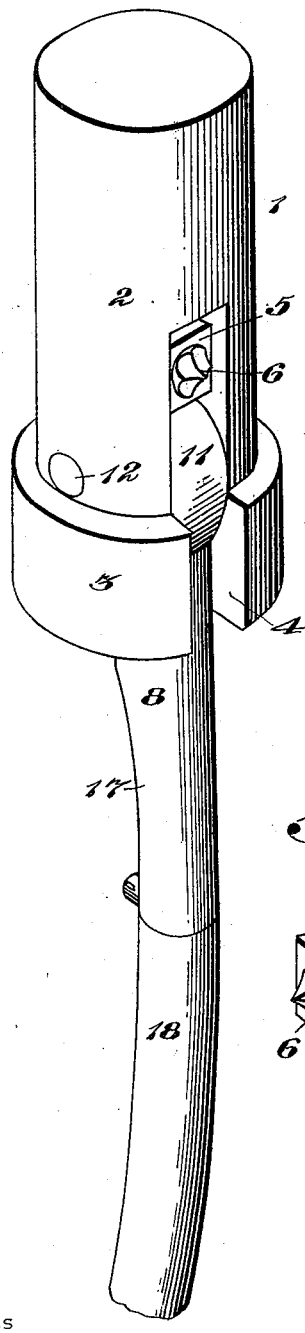
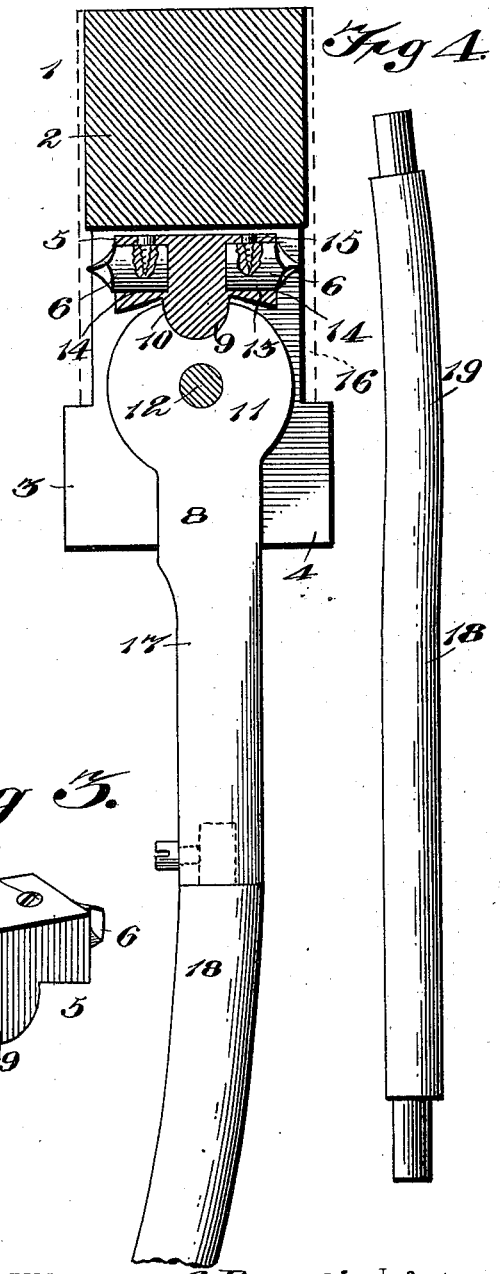
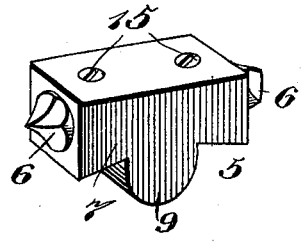
Witnesses
John Maupin
H. F. Riley
Harry A. Benefiel, Inventor
By his Attorneys,
C. A. Snow & Co.

UNITED STATES PATENT OFFICE.

HARRY A. BENEFIEL, OF COLUMBUS, INDIANA.

TUBE-CUTTER.

SPECIFICATION forming part of Letters Patent No. 658,136, dated September 18, 1900.

Application filed March 15, 1900. Serial No. 8,800. (No model.)

*To all whom it may concern:*

Be it known that I, HARRY A. BENEFIEL, a citizen of the United States, residing at Columbus, in the county of Bartholomew and State of Indiana, have invented a new and useful Tube-Cutter, of which the following is a specification.

The invention relates to improvements in tube-cutters.

The object of the present invention is to improve the construction of tube-cutters and to provide a simple, inexpensive, and efficient device designed for cutting tubes out of tubular boilers and adapted to feed itself automatically and rotate within a tube or flue and make a complete circular cut without necessitating the operator rotating it by hand.

The invention consists in the construction and novel combination and arrangement of parts hereinafter fully described, illustrated in the accompanying drawings, and pointed out in the claims hereto appended.

In the drawings, Figure 1 is a perspective view of a tube-cutter constructed in accordance with this invention. Fig. 2 is a longitudinal sectional view of the same. Fig. 3 is a detail perspective view of the cutter. Fig. 4 is a detail view of one of the sections of the handle of the lever.

Like numerals of reference designate corresponding parts in all the figures of the drawings.

1 designates a cutter-head provided with a reduced mandrel portion 2 and having an enlargement 3, the reduced mandrel portion being adapted to be inserted in the tubes or flues of a boiler and the enlargement being adapted to fit against the end of the same and forming a stop to limit the inward movement of the cutter-head. The cutter-head is provided with a slot or bifurcation 4, extending inward from its enlarged portion to approximately its center and receiving and forming transverse ways for a transversely-reciprocating cutter 5, provided at its ends with knives 6 or other suitable cutting devices and having flat side faces 7, which fit against the parallel side walls of the bifurcation, whereby the transversely-reciprocating cutter is guided in its movements. The transversely-reciprocating cutter is actuated by means of a lever 8, and it has a segmental lug 9 extending centrally from one of its edges or faces and received within a corresponding recess 10 of the lever 8. The lever 8, which is provided with a circular head 11, is fulcrumed on a transverse pin 12, arranged at right angles to the reciprocating cutter and passing through suitable perforations of the cutter-head and the head of the lever. When the lever is oscillated, the cutter 5 is reciprocated, and the said cutter 5 is recessed or cut away at opposite sides of the segmental lug 9 to provide a space or clearance for the head of the lever.

The knives 6 are provided with shanks which are secured within sockets 14 of the reciprocating cutter 5 by means of screws 15, passing through perforations of the said cutter 5 and engaging suitable sockets of the shanks 13 of the knives. The cutting edges of the knives are disposed in opposite directions and are arranged diagonally of the body or mandrel portion of the cutter-head, and when they engage a tube or flue their side faces are turned slightly in the direction of the line of movement around the interior of such pipe or flue and they are capable of automatically feeding and advancing the tube-cutter to produce a complete circular cut and to obviate the necessity of rotating the device by hand. Instead of employing knives of the form shown cutting edges or any other suitable form of cutting device may be provided for this purpose.

The cutter-head is adapted, as illustrated in dotted lines in Fig. 2 of the accompanying drawings, to receive a band 16 to increase the diameter of the reduced or mandrel portion, whereby the device will be adapted to operate on tubes of a greater diameter than the cutter-head. For instance, the reduced or mandrel portion of the cutter-head may be constructed of a given diameter—say two or three inches—and it may be increased by means of bands or sleeves a quarter of an inch, a half of an inch, or even an inch, whereby it is adapted to operate effectively on tubes or flues of different diameters.

The lever is provided with a handle composed of sections. The section 17 is provided with a socket adapted to receive either of the reduced portions or tenons of the sections 18, and the latter has its reduced portions or tenons arranged at an angle to each other, as clearly illustrated in Fig. 4 of the accompanying drawings, and is provided, adjacent to one of the tenons, with a bend 19. By this construction either a straight or a bent handle may be provided, the straight handle being adapted for operating on tubes at the center of the boiler and the bent handle being designed for use while cutting tubes adjacent to the smoke-head.

It will be seen that the tube-cutter is exceedingly simple and inexpensive in construction, that it is positive, reliable, and automatic in its feeding operation, and that by simply oscillating the lever the reciprocating cutter will cut through a tube or flue and rotate the cutter-head, and thereby make a complete circular cut.

What I claim is—

1. A device of the class described comprising a rotary cutter-head adapted to be introduced into a tube or flue and provided with a slot or bifurcation having a straight inner end wall extending entirely across the cutter-head and forming a guide, a transversely-reciprocating cutter consisting of a block having straight faces to fit the walls of the slot or bifurcation and provided with a segmental lug located between its ends, said cutter being provided at its ends with cutting edges, and a lever fulcrumed in the slot or bifurcation, and provided with a recess receiving the lug, substantially as described.

2. A device of the class described comprising a rotary cutter-head, adapted to be introduced into a tube or flue, and provided with a slot or bifurcation having straight side and end walls extending entirely across it, the transversely-reciprocating cutter consisting of a block arranged within the slot or bifurcation and having straight faces conforming to the configuration of the straight wall of the slot or bifurcation and guided by the same, said block being provided at its ends with sockets, the knives having shanks secured in the sockets, and the lever fulcrumed in the slot or bifurcation and connected with the block and adapted to reciprocate the same, substantially as described.

3. A device of the class described comprising a cutter-head adapted to be introduced into the tubes or flues of a boiler and provided with a slot or bifurcation, a reciprocating cutter mounted in the slot or bifurcation, and a lever fulcrumed in the slot or bifurcation and composed of sections detachably fitted together, one of the sections being provided near one of its ends with a bend and being reversible, whereby either end may be connected with the adjacent section of the lever to provide either a straight or bent handle to enable the cutter to operate at different points on a boiler, substantially as described.

In testimony that I claim the foregoing as my own I have hereto affixed my signature in the presence of two witnesses.

HARRY A. BENEFIEL.

Witnesses:
HOUCK TICE,
FRANK P. BOYD.